(12) United States Patent
Harif et al.

(10) Patent No.: US 8,517,645 B2
(45) Date of Patent: *Aug. 27, 2013

(54) ATTACHMENT PARTICULARLY USEFUL FOR MILLING MACHINES TO ENABLE CUTTING SHARP INTERIOR CORNERS AND A CUTTER MEMBER FOR USE THEREIN

(75) Inventors: Gershon Harif, Ramat Gan (IL); Josef Gurievich, Afula (IL)

(73) Assignee: G.R.G Patents Lrd., Industry Zone, Holon (IL)

( * ) Notice: Subject to any disclaimer, the term of this patent is extended or adjusted under 35 U.S.C. 154(b) by 1369 days.

This patent is subject to a terminal disclaimer.

(21) Appl. No.: 11/889,206

(22) Filed: Aug. 9, 2007

(65) Prior Publication Data
US 2008/0044247 A1    Feb. 21, 2008

Related U.S. Application Data

(63) Continuation-in-part of application No. PCT/IL2007/000134, filed on Feb. 1, 2007, which is a continuation-in-part of application No. 11/350,738, filed on Feb. 10, 2006, now Pat. No. 7,390,152.

(51) Int. Cl.
*B23C 3/26* (2006.01)

(52) U.S. Cl.
USPC ........... 409/143; 409/138; 409/215; 409/230; 409/214; 409/180; 409/201

(58) Field of Classification Search
USPC ......... 409/215, 230, 138, 144, 214, 175–182, 409/218, 210, 201, 211, 216, 143
IPC ....................................................... B23C 3/26
See application file for complete search history.

(56) References Cited

U.S. PATENT DOCUMENTS

| 1,499,818 | A |   | 7/1924 | Franconetti |
| 1,991,500 | A | * | 2/1935 | Eklind ........................ 409/216 |

(Continued)

FOREIGN PATENT DOCUMENTS

| JP | 09-117845 | A | * | 5/1997 |
| WO | WO-2005/023473 | A1 | * | 3/2005 |

OTHER PUBLICATIONS

Extended European Search Report mailed Feb. 14, 2011, for corresponding European Application No. 07706077.0, consisting of 10 pages.

*Primary Examiner* — Erica E Cadugan
(74) *Attorney, Agent, or Firm* — Nath, Goldberg & Meyer; Jerald L. Meyer; Scott C. Langford

(57) ABSTRACT

An attachment to a milling machine having a rotary drive, particularly useful for cutting sharp interior corners in a workpiece, comprising a rotary shaft couplable to the rotary drive of the milling machine so as to be rotatable about the shaft's longitudinal axis. The attachment further comprises a conical cutter member having a rotary axis, an apex located on the axis, and at least one external conical surface portion having a leading end at the apex and a trailing end spaced apart from the rotary axis and from the apex along the rotary axis. The conical cutter member has a cutting edge constituting a part of the conical surface portion and extending between the leading and trailing ends thereof. The rotary axis of the conical cutter member is oriented transversely though not perpendicularly to the shaft longitudinal axis. The conical cutter member being coupled to the rotary shaft so as to be rotated about the rotary axis by the shaft, upon the shaft's rotation about the longitudinal axis.

23 Claims, 13 Drawing Sheets

(56) References Cited

U.S. PATENT DOCUMENTS

| | | |
|---|---|---|
| 2,363,444 A | 11/1944 | Shipman |
| 3,699,843 A | 10/1972 | Sweeny |
| 3,848,512 A | 11/1974 | Erhardt |
| 4,032,251 A | 6/1977 | Ribich |
| 4,716,657 A | 1/1988 | Collingwood |
| 4,720,221 A * | 1/1988 | Yoshioka et al. ............ 409/144 |
| 4,981,057 A | 1/1991 | Von Haas et al. |
| 5,168,609 A | 12/1992 | Kojima et al. |
| 5,237,895 A | 8/1993 | Danielsen |
| 5,415,066 A | 5/1995 | Erickson et al. |
| 5,697,739 A | 12/1997 | Lewis et al. |
| 6,032,350 A | 3/2000 | Roeske |
| 6,033,166 A | 3/2000 | Hampel |
| 6,149,354 A | 11/2000 | Walters |
| 6,530,727 B2 | 3/2003 | Harmand et al. |
| 6,554,551 B1 | 4/2003 | Marelli |
| 6,565,497 B1 | 5/2003 | Yamazaki et al. |
| 6,746,188 B2 | 6/2004 | Watanabe |
| 6,752,750 B2 | 6/2004 | Adachi et al. |
| 6,821,063 B2 | 11/2004 | Debat et al. |
| 6,825,630 B2 | 11/2004 | Katoh et al. |
| 6,840,896 B2 | 1/2005 | Endo et al. |
| 6,884,007 B2 | 4/2005 | Kress et al. |
| 6,890,133 B2 | 5/2005 | Singh et al. |
| 6,976,813 B2 | 12/2005 | Shinoda |
| 7,004,693 B2 | 2/2006 | Adachi et al. |
| 7,121,773 B2 | 10/2006 | Mikiya et al. |
| 7,137,761 B2 | 11/2006 | Hara et al. |
| 7,306,412 B2 * | 12/2007 | Masuyama ............ 409/143 |
| 7,390,152 B2 * | 6/2008 | Harif et al. ............ 409/201 |
| 8,100,613 B2 * | 1/2012 | Foletti et al. ............ 409/210 |
| 2007/0217881 A1 * | 9/2007 | Harif et al. ............ 409/144 |

* cited by examiner

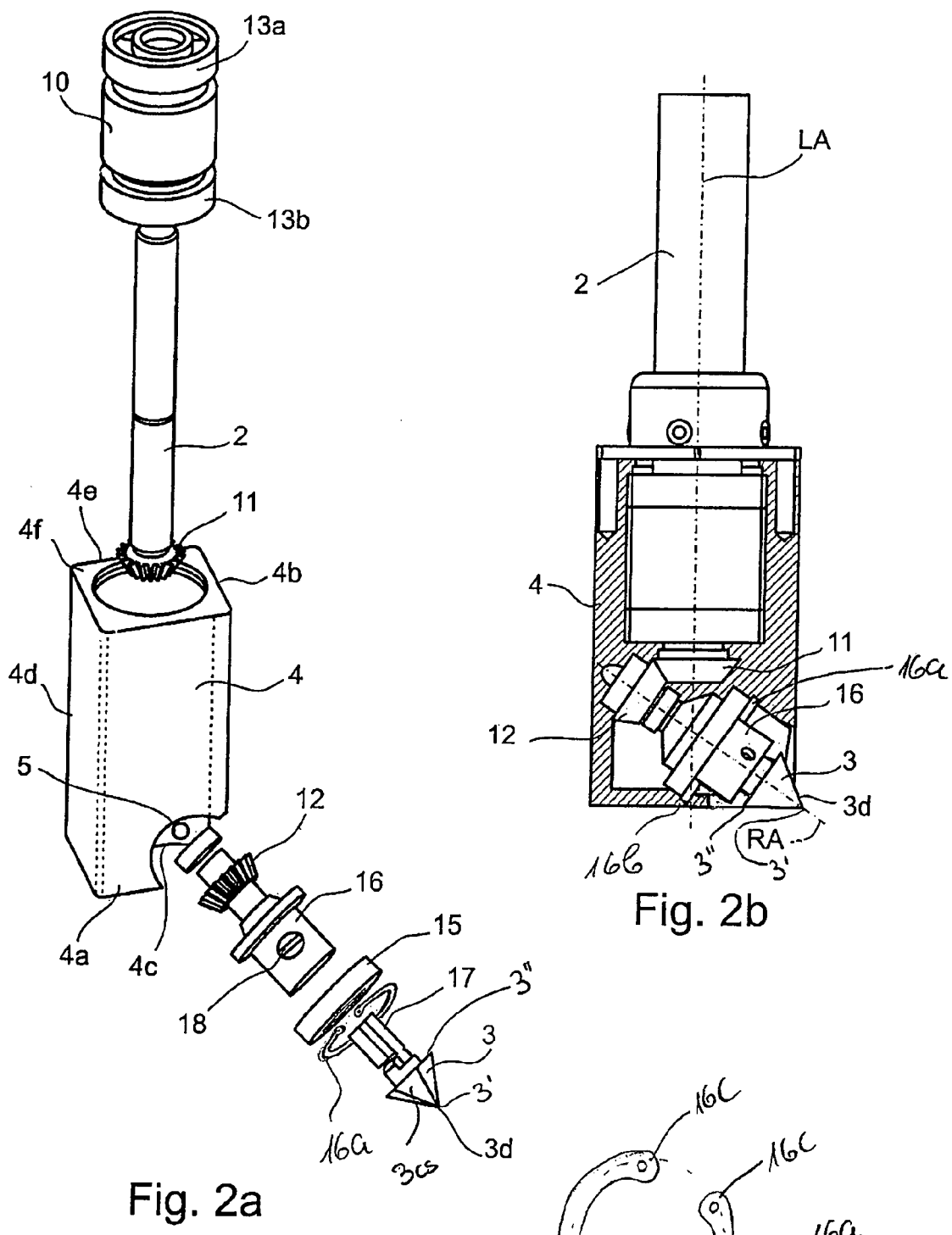
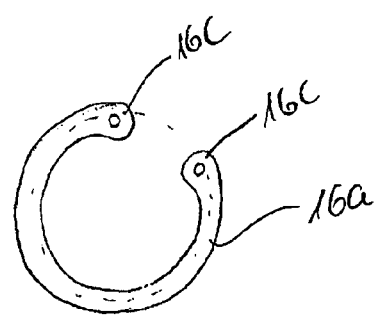
Fig. 2a
Fig. 2b
Fig. 2c

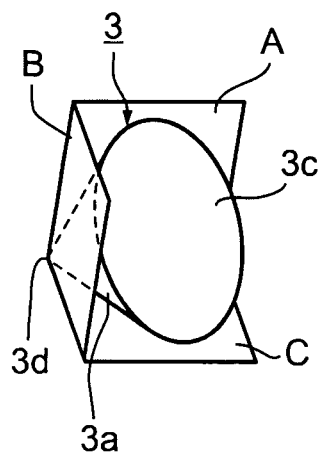
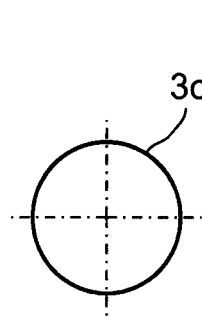
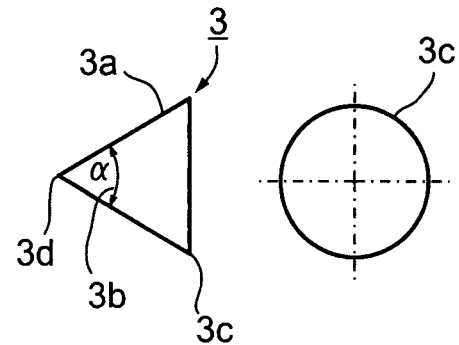
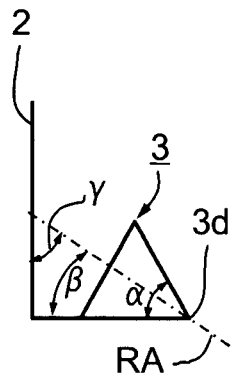
Fig. 3a     Fig. 3b     Fig. 3c     Fig. 3d
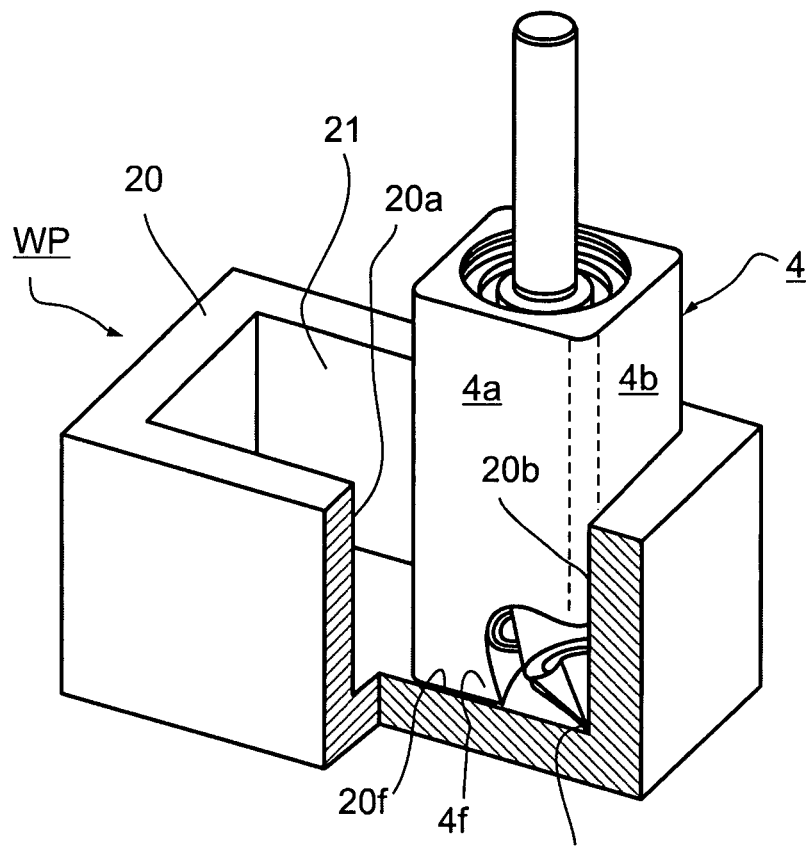
Fig. 4

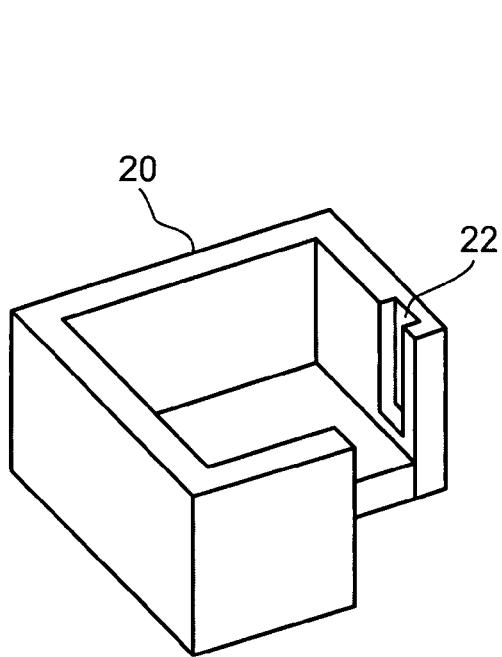
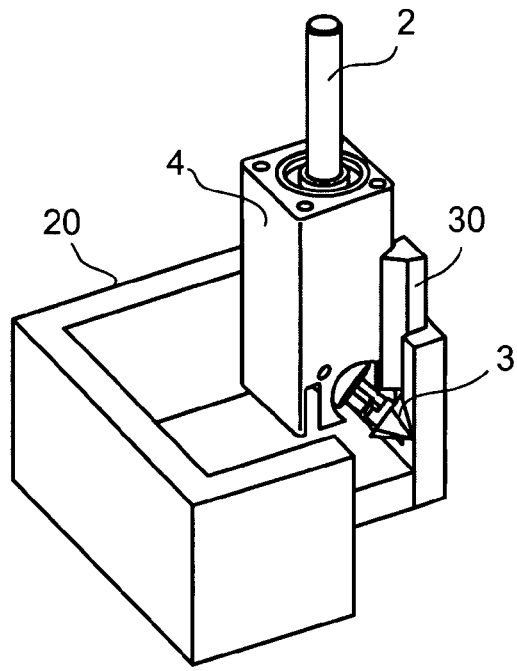
Fig. 6                    Fig. 5
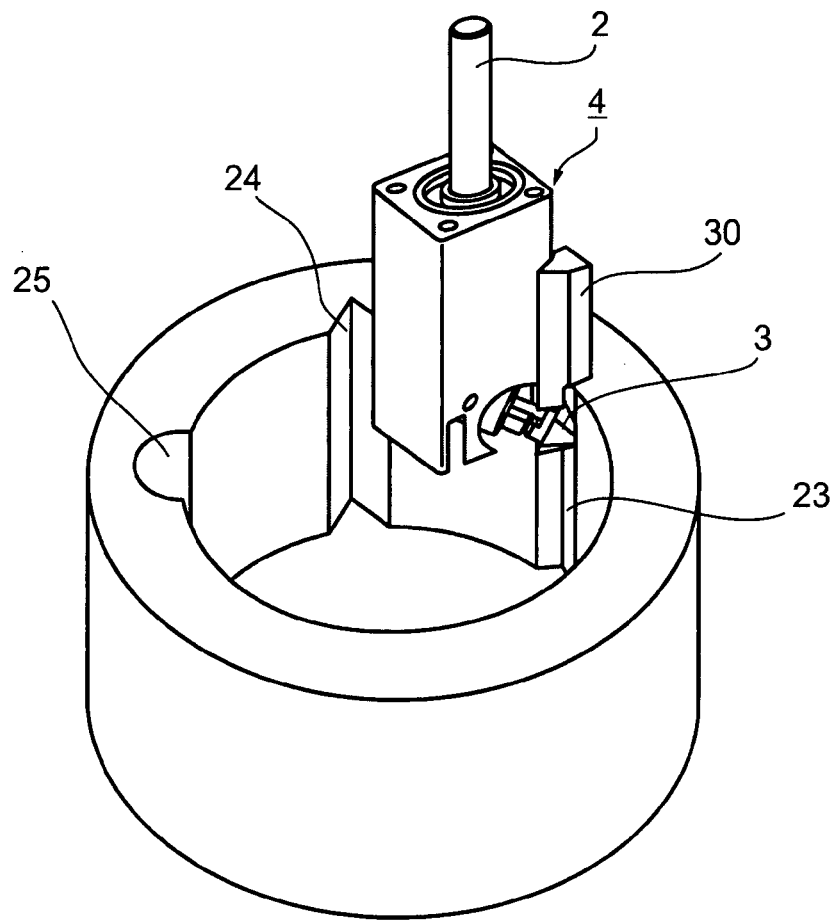
Fig. 7

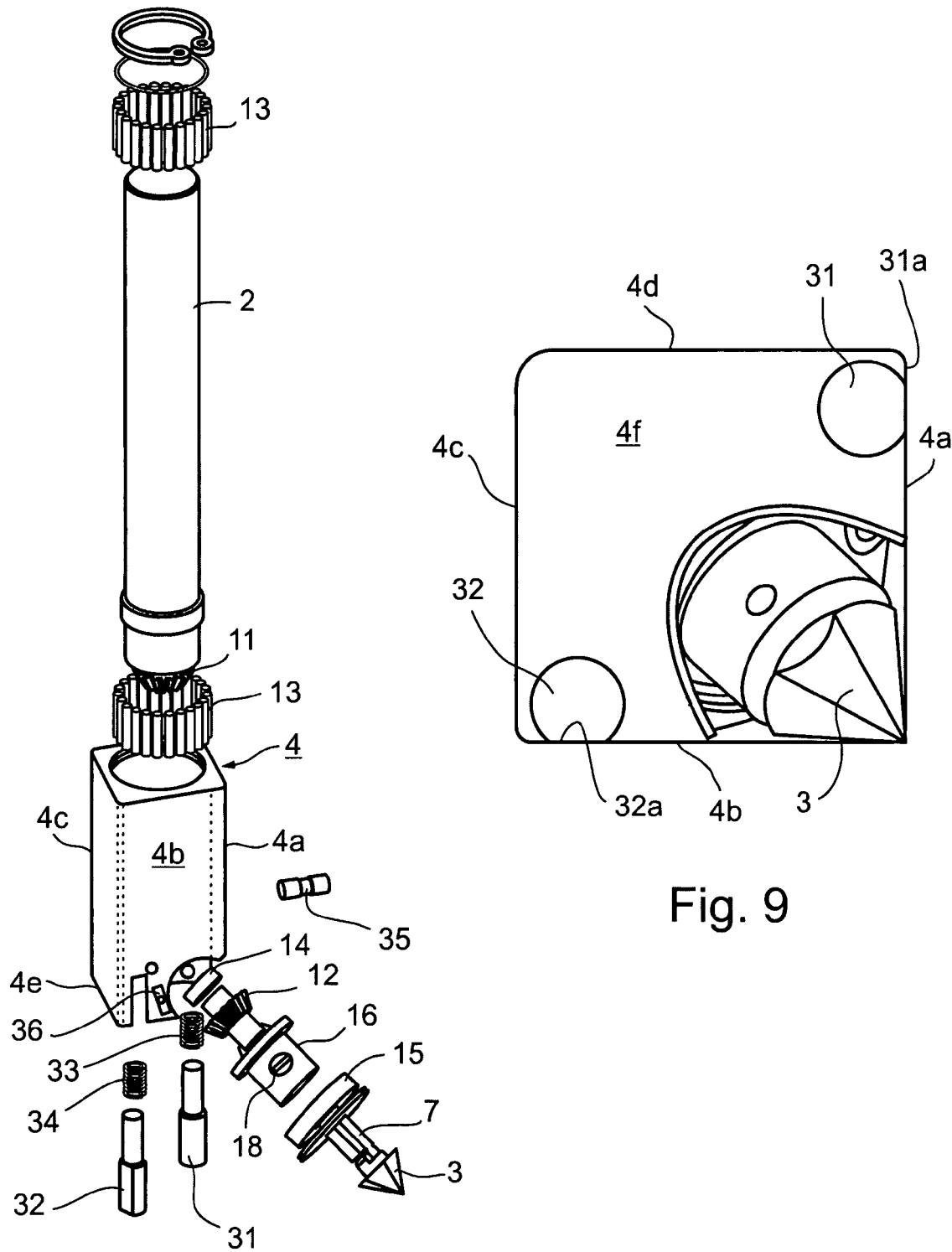

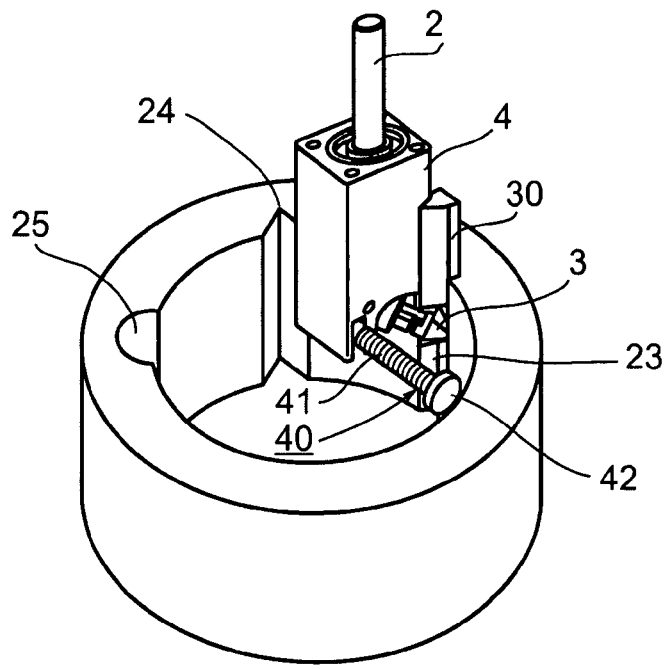
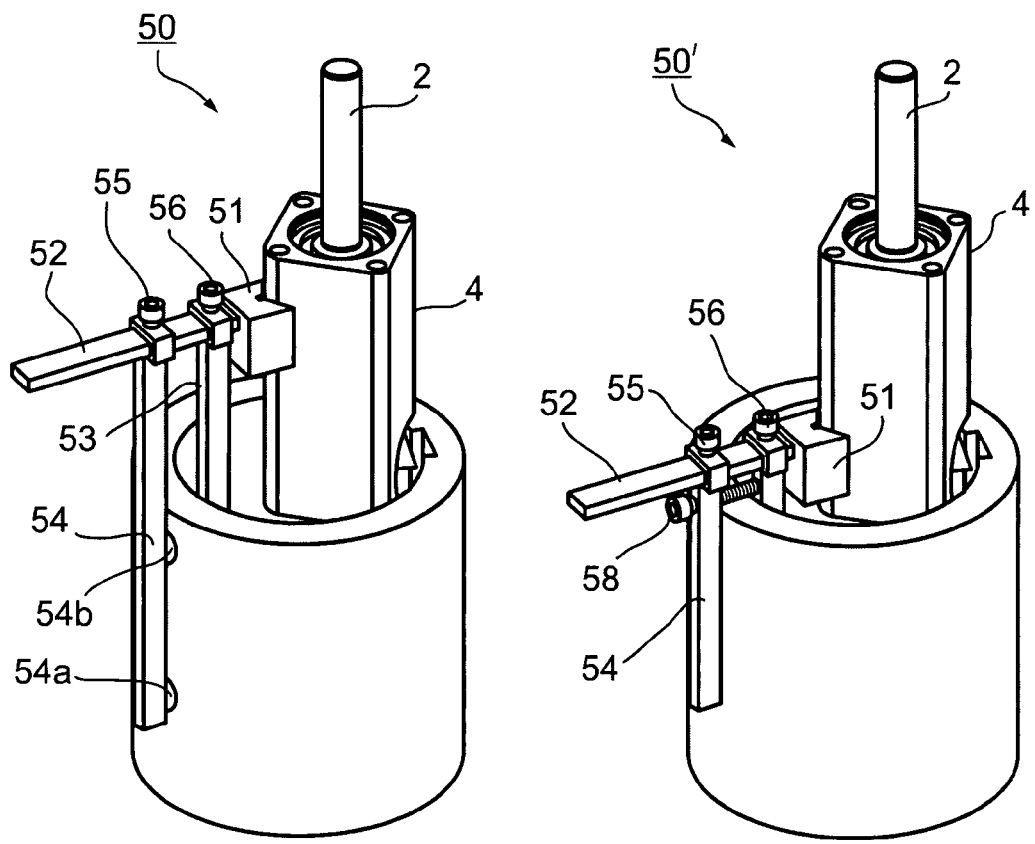
Fig. 10
Fig. 11
Fig. 12

Conical Cutter Member with a Rounded Apex

Fig. 21

ATTACHMENT PARTICULARLY USEFUL FOR MILLING MACHINES TO ENABLE CUTTING SHARP INTERIOR CORNERS AND A CUTTER MEMBER FOR USE THEREIN

This application is a continuation-in-part of PCT Application No. PCT/IL2007/000134 filed Feb. 1, 2007, which is a continuation-in-part of and claiming priority from U.S. patent application Ser. No. 11/350,738 filed Feb. 10, 2006, now U.S. Pat. No. 7,390,152.

FIELD OF THE INVENTION

The present invention relates to milling heads for milling machines used for machining workpieces, and particularly to milling heads useful for cutting sharp internal corners in workpieces, and to cutter members for use therein.

BACKGROUND OF THE INVENTION

Milling machines, both the vertical type and horizontal type, are used for machining workpieces according to a large number of complex operations, such as slotting, planing, drilling, rabbeting, routing, etc. However, the conventional milling machine is not capable of making certain types of cuts, such as keyways and slots having sharp interior corners. Therefore when these types of cuts are required to be made, a conventional milling machine is generally used to cut the workpiece in an unfinished form, and then another working operation is performed on the workpiece, such as a laser machining or a chemical etching operation, in order to finish the workpiece with the desired sharp internal corners.

SUMMARY OF THE INVENTION

According to one aspect of the present invention, there is provided an attachment to a milling machine having a rotary drive, particularly useful for cutting sharp interior corners in a workpiece, comprising: a rotary shaft couplable to the rotary drive of the milling machine so as to be rotatable about the shaft's longitudinal axis; and a conical cutter member having a rotary axis, an apex located on said axis, at least one external conical surface portion having a leading end at said apex and a trailing end spaced apart from said rotary axis and from said apex along said rotary axis, and a cutting edge constituting a part of said conical surface portion and extending between said leading and trailing ends thereof; said rotary axis of the conical cutter member being oriented transversely though not perpendicularly to said shaft longitudinal axis; and the conical cutter member being coupled to the rotary shaft so as to be rotated about said rotary axis by the shaft, upon the shaft's rotation about said longitudinal axis.

According to another aspect of the present invention, there is provided an attachment for a milling machine head having a longitudinal axis about which a cutting tool is normally rotated when working a workpiece, the attachment comprising: a coupling sleeve attachable to the milling machine head with a longitudinal axis of the coupling sleeve coaxial to the longitudinal axis of the milling machine head; and a rotary cutter member carried by the coupling sleeve and rotatable with respect thereto about a rotary axis which is oriented at a predetermined acute angle with respect to the longitudinal axis of the sleeve.

According to further features of the invention, the coupling sleeve is attachable to the milling machine head so as to allow any desired orientation of the rotary cutter member and consequently its rotary axis, around the longitudinal axis of the coupling sleeve.

The coupling sleeve may include a shaft couplable to the milling machine head so as to be coaxial with the longitudinal axis of the milling machine head; the shaft carrying a first bevel gear; the rotary cutter member carrying a second bevel gear engageable with the first bevel gear carried by the shaft.

In most described embodiments, the shaft is rotated by the milling machine about its longitudinal axis such that it rotates the rotary cutter member about its rotary axis by the engagement of the bevel gear of the rotary cutter member with the bevel gear of the shaft. However, in one described embodiment, the attachment may include a separate drive for driving a further bevel gear engageable with the second bevel gear carried by the rotary cutter member to rotate the rotary cutter member.

According to a further aspect of the present invention, the external surface of the sleeve is engageable with the workpiece to align the conical cutter member with respect to a surface of the workpiece to be milled.

In particular, the sleeve may have at least first and second side walls with flat external surfaces meeting at a sleeve corner at an angle corresponding to that of the corner to be cut, and the conical cutter member may be at least partially disposed within the sleeve, with the rotary axis thereof lying in a bisecting plane of the sleeve corner. In order to locate the apex of the conical cutter member in a position to cut in a workpiece a sharp interior corner defined by at least two planes, the sleeve may be so disposed that the external surfaces of its two side walls abut the two planes, to prevent rotation of the sleeve when its shaft is rotated to rotate the rotary cutter member about its rotary axis.

According to further features of the present invention, the coupling sleeve includes top and bottom walls, a side wall extending therebetween and an opening at the merger between the bottom wall and the side wall, with which opening the rotary cutter member is aligned. Preferably, the rotary cutter member is a conical cutter member and has an apex locatable to be substantially flush with the outer surface of the bottom wall of the sleeve. The conical cutter member is preferably adjustably mounted with respect to the coupling sleeve so as to permit the apex of the conical cutter member to be projected a desired distance through the opening in the sleeve.

According to another aspect of the present invention, there is provided an attachment for a milling machine head having a longitudinal axis about which a cutting tool is normally rotated when working a workpiece, the attachment comprising: a shaft attachable to the milling machine head with the longitudinal axis of the shaft coaxial with the longitudinal axis of the milling machine head; and a conical cutter member carried by the attachment and rotatable about a rotary axis which is oriented at an acute angle to the longitudinal axis of the shaft.

When the attachment is to be used for cutting a sharp interior corner in a workpiece, for example, a corner defined by the juncture of at least two orthogonal planes, the external conical surface of the conical cutter member may have a pointed apex and a cutting edge extending along the conical surface away from said pointed apex and from the rotary axis, the conical surface having such a cone angle that, when said apex is disposed in said corner, the conical surface contacts at least one of said orthogonal planes all along the axial dimension of the conical surface. Thus, during rotation of said cutter member, the cutting edge thereof may alternately come in contact with and cut the workpiece along each of the orthogonal planes.

The cutter member may have such a cone angle as to contact both the above orthogonal planes along corresponding two lines, defining between them an angle dependent on the acute angle between the rotary axis of the cutter member and the longitudinal axis of the shaft. In particular, when the apex of the cone is positioned between two orthogonal planes, the juncture line between which is parallel to the longitudinal axis of the shaft, the greater the acute angle between the longitudinal and rotary exes, the greater the cone angle may be. For example, with said acute angle being greater than 50°, in particular, being in the range between 50° and 70°, and for example being about 55°, the cone angle may approach 70°, in particular being in the range between 75° and 65°, and for example being about 70°. For a more precise example, the cone angle may be 70.52° (70°31'12"); and the angle of the rotary axis of the conical cutter member with respect to the shaft longitudinal axis may be 54.74° (54°44'24"), in which case the rotary cutter may contact simultaneously three orthogonal planes and each line of contact between the conical surface of the cutter member with one of the orthogonal planes constitutes a bisecting line of the right angle defined by the intersection of this plane with the other two planes, and each couple of these lines lies in a plane passing through the rotary axis of the cutting member.

Such an attachment may be constructed for attachment to a conventional milling machine in order to adapt it to perform various types of special cutting operations, such as cutting sharp internal corners, heretofore not possible or practicable by conventional milling machines.

According to a specific embodiment, the cutter member may have an external surface with a relatively sharp cone angle allowing the conical surface of the cutter member, when positioned in a corner to be cut, to contact along a contact line only one of the orthogonal surfaces at a time, or not to contact any of these surfaces at all but rather work essentially only with the apex area of the conical surface to cut deeper into the workpiece corner. Thus, the workpiece may be cut to have a small recess within the interior corner as opposed to a right orthogonal angle between the orthogonal planes as previously discussed. For example, the cutter member may be formed with a conical surface portion having an angle of about 50° and the angle of its rotary axis with respect to the longitudinal axis may subsequently change to about 65°.

It would be appreciated that for the creation of interior corners formed by the intersection of any two or three planes (not necessarily orthogonal), a different angle of the conical surface may be used.

According to another aspect of the present invention, there is provided an apparatus including a rotary shaft, a rotary device driven by the shaft, and a releasable coupling normally coupling the rotary device to the rotary shaft but effective to release the rotary device from the rotary shaft at a predetermined rotary speed of the rotary shaft, the releasable coupling comprising: a projection carried by the rotary shaft receivable in a recess in the rotary device; a spring carried by the rotary shaft and normally urging the projection into the recess; and a weight carried by the projection effective, by centrifugal force, to move the projection out of the recess at a predetermined rotary speed of the rotary shaft.

As will be described more particularly below, the foregoing feature is particularly useful in attachments constructed in accordance with the present invention since it enables the rotary axis of the rotary cutter member to be conveniently adjusted initially with respect to the longitudinal axis of the milling machine head, and once adjusted, the rotation of the rotary shaft by the milling machine head will automatically decouple the coupling sleeve from the rotary shaft to permit free rotation of the rotary cutter member with respect to the coupling sleeve.

According to a further feature of the invention, the conical cutter member is adjustably mounted with respect to the rotary shaft and the sleeve to permit the apex of the conical cutter member to be projected from the sleeve to a desired distance along the rotary axis of the cutter member.

The attachment may be constructed as a modular unit for attachment to a conventional milling machine in order to perform various types of special cutting operations, such as cutting sharp internal corners, heretofore not possible by conventional milling machines.

According to another aspect of the present invention there is provided a conical cutter member having a rotary axis, an apex located on said axis, at least one external conical surface portion having a leading end at said apex and a trailing end spaced apart from the rotary axis and from said apex along said rotary axis, and a cutting edge constituting a part of said conical surface portion and extending between said leading and trailing ends thereof; the conical cutter member being adapted for rotation around its rotary axis by a shaft whose longitudinal axis is oriented thereon transversely though not perpendicularly to said longitudinal axis, so as to be rotated about said rotary axis by the shaft, upon its rotation about said longitudinal axis.

It would be appreciated that the cutter member may be formed with a plurality of conical surface portions, wherein each portion is formed with a cutting edge extending between the leading end and the trailing end thereof. The use of a plurality of conical surface portions on the same cutter member may provide more efficient cutting of the workpiece.

Further features and advantages of the invention will be apparent from the description below.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2a is an exploded view illustrating the attachment of FIG. 1;

FIG. 2b is a sectional view illustrating the attachment of FIG. 1;

FIG. 2c is a schematic view of a spring ring which may be used in the attachment of FIG. 1;

FIGS. 3a, 3b and 3c are diagrams illustrating the conical surface of the conical cutter member of the attachment of FIG. 1; and, FIG. 3d illustrates the manner of computing the optimum angle of the conical cutter member rotary axis with respect to the longitudinal axis of the milling machine head;

FIG. 4 illustrates one manner of using the attachment of FIG. 1 for cutting a sharp interior corner in a workpiece;

FIG. 5 illustrates a modification in the attachment of FIG. 1, and the manner of using such an attachment for cutting sharp internal corners in a workpiece;

FIG. 6 illustrates the workpiece produced by using the attachment of FIG. 5 in the manner described;

FIG. 7 illustrates another use of the attachment of FIG. 5 for cutting various types of slots in the inner surface of a cylindrical workpiece;

FIG. 8 is an exploded view illustrating another attachment constructed in accordance with the present invention;

FIG. 9 is a bottom plan view of the attachment of FIG. 8;

FIG. 10 illustrates a further attachment constructed in accordance with the present invention to include a guiding screw for guiding the movement of the attachment with respect to the workpiece, or vice versa;

FIG. 11 illustrates another attachment constructed in accordance with the present invention including another guiding assembly for guiding the movement of the attachment with respect to the workpiece, or vice versa;

FIG. 12 illustrates a modification in the guiding assembly of FIG. 11;

FIG. 21 schematically illustrates a conical cutter member with a rounded apex.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DETAILED DESCRIPTION OF EMBODIMENTS

The invention is described below with respect to a number of attachments constructed in accordance with the invention for attachment to a conventional milling machine head having a longitudinal axis about which a cutting tool is normally rotated when working a workpiece, in which the cutting operations are controlled by either moving the cutting tool with respect to the workpiece, or the workpiece with respect to the cutting tool. It will be appreciated that the constructions described below merely represent several preferred embodiments of the invention, and that the features of the invention, as defined in the appended claims, may be implemented in many other attachment constructions.

Figure 1:
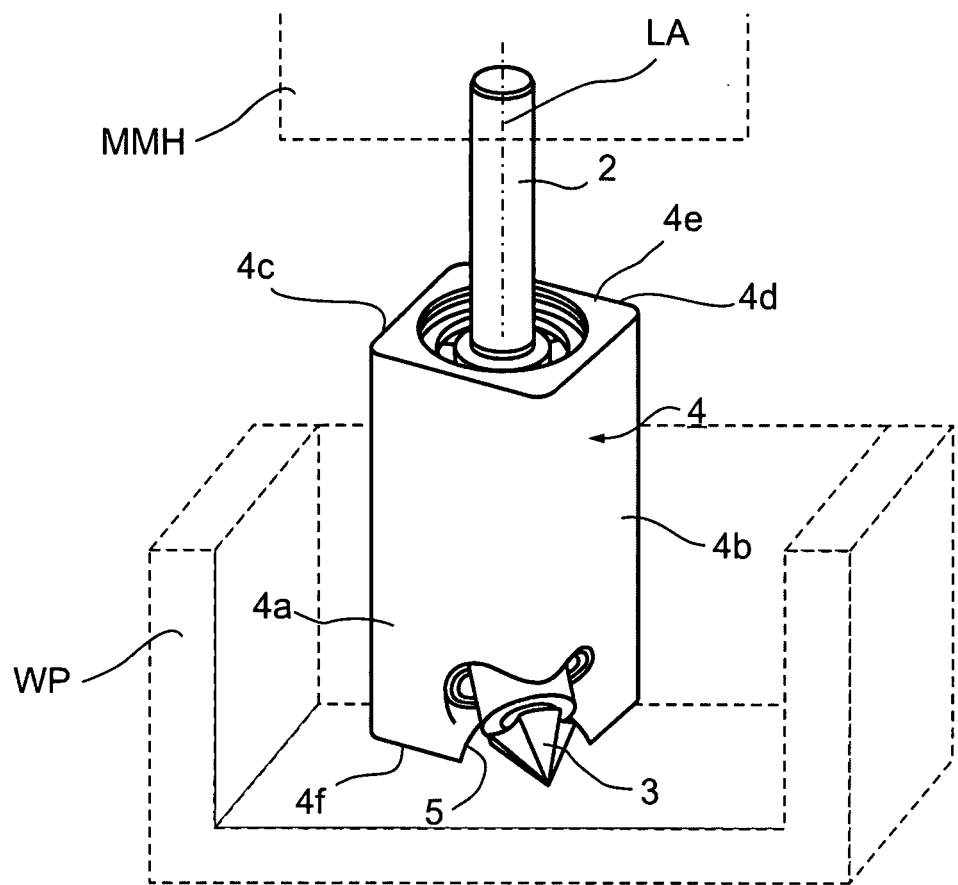
FIG. 1 is a broken-away three-dimensional view illustrating one form of attachment for a milling machine head constructed in accordance with the present invention.

FIGS. 1, 2a and 2b illustrate the basic components of one form of attachment constructed in accordance with the present invention for attachment to a milling machine head, schematically indicated at MMH, having a longitudinal axis LA about which a cutting tool is normally rotated when working a workpiece WP. As indicated above, the cutting operations may be controlled by either moving the cutting tool secured to the milling machine head MMH with respect to the workpiece WP, or vice versa.

The illustrated attachment includes a rotary shaft 2 couplable to the rotary drive of the milling machine head so as to be rotatable about the longitudinal axis LA; and a conical cutter member 3 having an external conical surface comprised of a plurality of portions $3_{CS}$ each having a cutting edge $3_{CE}$ extending between its leading end 3' constituted by the apex of the conical surface and a trailing end 3" disposed at the base of the cutter member 3. Conical cutter member 3 is coupled to rotary shaft 2 so as to be rotated thereby about a cutter member rotary axis RA (FIG. 2b) at a predetermined angle with respect to the longitudinal axis LA of the shaft. For this purpose, the illustrated attachment includes a coupling sleeve 4 attachable to shaft 2 with the longitudinal axis of the sleeve coaxial with the longitudinal axis LA of shaft 2, as well as of the milling machine head MMH. Coupling sleeve 4 thus couples the rotary cutter member 3 to rotate about the rotary axis RA (FIG. 2b). As will be described more particularly below, coupling sleeve 4 also permits angular adjustment of the rotary axis RA of the rotary cutter member 3 around the longitudinal axis LA of the shaft 2 and of the coupling sleeve 4. Coupling sleeve 4 is formed with an opening 5 with which cutter member 3 is aligned.

Coupling sleeve 4 is preferably of a hexahedral configuration. It is constructed of six walls 4a-4f perpendicular to each other, with conical cutter member 3 being aligned with the opening 5 at the intersection of three of such perpendicular walls, two side walls 4a, 4b, and bottom wall 4f. A further embodiment however, is described below (FIG. 14) wherein the coupling sleeve may be of a cylindrical configuration.

Where the attachment is to be used for cutting sharp, right angled internal corners, the cone angle of the conical surface portions $3_{CS}$ of the conical cutter member is substantially 70°, more precisely 70.52° (70°31'12'), and the rotary axis RA of the conical cutter member is substantially 55°, more precisely 54.74° (54°44'24"), allowing the cutting edges $3_{CE}$ to be flush against the workpiece during operation of the attachment as will be described herein.

The latter is illustrated by the diagrams of FIGS. 3a-3d. FIG. 3a is a three-dimensional diagram illustrating at 3a the conical surface of the conical cutter member 3; FIG. 3b is a side view illustrating at 3b the most-preferred cone angle of the conical cutter member; FIG. 3c is a plan view illustrating at 3c the large-diameter end of the conical cutter member 3; and, FIG. 3d illustrates the manner of computing the optimum angle of the conical cutter member rotary axis with respect to the longitudinal axis of the shaft. It would be appreciated that for the sake of geometric explanation, the cutter member 3 is shown schematically as a full cone, without the cutting edges $3_{CE}$.

As seen particularly in FIGS. 3a and 3b, when the conical cutter member 3 is formed with a pointed apex 3d constituting the leading end of its cutting edge(s) $3_{CE}$, and its cone angle is precisely 70.52° (70°31'12"), the conical cutter member 3 can cut sharp interior corners at the intersection lines of the three planar surfaces A, B, C. As seen in FIG. 3d, when the cone angle (α) of the conical cutter member is 70.52°, its rotary axis defines an angle (β), with the line normal to the longitudinal axis LA of shaft 2, of substantially 35.26°

(35°15'36"), whereby the angle (γ) defined by the rotary axis RA of the conical cutter member (being complementary to β) is 54.74° (54°44'24"). Thus, when the leading end 3' of the conical cutter member 3 is positioned at the juncture point of the three surfaces, each of its external conical surface portions $3_{CS}$ comes in contact with each of the planes A, B and C, along bisecting lines $A_{BS}$, $B_{BS}$ and $C_{BS}$ of the angles defined by the lines of intersection of the planes. The importance of this configuration will be explained in detail later with respect to the operation of the cutter member.

The cone angle α' of the cutter member 3 may be smaller, and consequently, the acute angle γ' between its rotary axis RA and the longitudinal axis LA is also smaller than mentioned above, in which case the conical surface of the cutter member will not contact all the three surfaces A, B and C simultaneously, but only the upright surfaces A and B, the juncture line between which is parallel to the longitudinal axis LA, and the contact lines will not necessarily be the bisecting lines of the planes. It would be appreciated that when it is desired that the cutter member 3 come in contact with surfaces A and C, the juncture line between which is not parallel to the longitudinal axis, the same principle may apply, while using an appropriate acute angle between the longitudinal axis and the rotary axis.

FIGS. 2a and 2b more particularly illustrate the construction of the attachment of FIG. 1. In addition to the rotary cutter member 3 carried by coupling sleeve 4 with respect to shaft 2, the attachment includes: a clamping sleeve 10 clamping the rotary shaft 2 of the attachment to the rotary drive of the milling machine head MMH to rotate shaft 2 about its longitudinal axis; a bevel gear 11 at one end of rotary shaft 2: and a bevel gear 12 meshing with bevel gear 11 and coupled to the conical cutter member 3 to rotate it about its rotary axis RA, which at a predetermined angle with respect to the longitudinal axis LA of shaft 2. The illustrated attachment further includes a pair of bearings 13a, 13b for rotatably mounting shaft 2 with respect to sleeve 10; and further bearings 14 and 15 for rotatably mounting bevel gear 12 and cutter member 3 with respect to coupling sleeve 4. Bevel gear 12 is coupled to conical cutter member 3 by a chuck 16 receiving shank 17 of the conical cutter member 3.

In assembly, the mounting shaft 2 is inserted through the case 4 from the top wall 4f, and the sub assembly of the cutter member 3 including the bearing 15, chuck 16 and shank 17, is inserted into the opening 5 such that the bevel gears 11 and 12 mesh together. In order to prevent the pieces of the cutter member 3 from falling out of the opening 5, any conventional means may be used. In the described example, this means is in the form of a spring ring 16a (FIG. 2c) is inserted into the opening 5, where it may re-expand into a recess 16b of the case 4, thus fixedly positioned therein. The spring ring 16a has two end portions 16c which allow the spring ring to assume smaller dimension upon applying pressure to the end portions 16c closer to one another, and may re-expand one pressure is removed from the end portions 16c.

As indicated earlier particularly with respect to the diagram of FIG. 3a, cutter member 3 is formed with a sharply-pointed apex (3d) aligned with opening 5 in coupling sleeve 4 and flush with the outer surface of the coupling sleeve in order to permit the cutter member to cut sharp interior corners in the workpiece. An attachment constructed in accordance with the present invention, however, may be used in other applications as will be described more particularly below, e.g. wherein the conical cutter member 3 need not have a sharply-pointed apex, and/or need not be flush with the outer surface of the coupling sleeve. For this purpose, FIG. 2a illustrates the chuck 16 of the attachment as including a threaded pin 18 which permits the conical cutter member 3 to be axially adjusted with respect to opening 5 in coupling sleeve 4. Threaded pin also permits a conical cutter member having a sharply-pointed apex to be replaced by a cutter member having another apex, e.g. a rounded or relatively flat apex.

As indicated earlier, coupling sleeve 4 is preferably of a hexahedral configuration, including four sides walls 4a-4d, a top wall 4c, and a bottom wall 4f, all perpendicular to each other. Opening 5 for the conical cutter member 3 is formed in the intersection of two side walls 4a, 4b, and bottom wall 4f; the top wall 4c is formed with an opening for receiving the rotary shaft 2 to be coupled to the rotary drive of the milling machine head.

FIG. 4 more particularly illustrates how the attachment of FIGS. 1, 2a, 2b may be used for cutting sharp interior corners in a workpiece WP formed with a wall 20. Thus, as shown in FIG. 4, by locating coupling sleeve 4 of the attachment within a slot 21 in the workpiece wall 20, and making sure that the surfaces 4a, 4b, 4f of the attachment coupling sleeve 4 abut the slot's surfaces, to prevent rotation of the sleeve 4 when the shaft 2 is rotated, the rotation from the shaft 2 is transferred to the rotary cutter member 3, whose cutting edges $3_{CE}$ will cut sharp interior corners between respective surfaces 20a, 20b, 20f. It should be noted that when in a stationary position, during rotation of the cutter member 3, the cutting edges $3_{CE}$ thereof cut chips away from the workpiece 20, but since they contact the workpiece only at the contact lines, a certain amount of material may remain unchipped. In order to remove the unchipped material, it may be required to displace the entire milling head along the juncture lines of the surfaces 20a, 20b, 20c to create a sharp orthogonal corner.

FIGS. 5 and 6 illustrate one manner in which the above-described attachment may also be used for cutting, in a wall of workpiece 20, an internal slot 22 having sharp interior corners. For this purpose a guiding element, in the form of a spline 30 (FIG. 5), may be fixed to the outer surface of coupling sleeve 4 to extend parallel to its longitudinal axis and that of its rotary shaft 2. Spline 30 may be provided with an external configuration corresponding exactly to that of the finished slot 22 to be formed in workpiece 20. Thus, such a slot may be initially produced by any conventional attachment such that it would not have sharp internal corners. When the slot is to be finished with sharp internal corners, the attachment of FIG. 6 would be applied to the workpiece with spline 30 received within the unfinished slot 22. Since the outer surface of spline 30 exactly conforms to the inner surface of the slot 22 to be formed, it will be seen that the spline includes two sharp outer corners exactly conforming to the two sharp interior corners to be formed in the slot.

When using the attachment in the manner described with respect to FIG. 5, the apex of the conical cutter member 3 would be projected outwardly of opening 5 in coupling sleeve 4 to be flush with the outer surface of one corner of spline 30, and thereby to cut one sharp interior corner in slot 22. Spline 30, when so used, not only guides the movement of the conical cutter member parallel to the rotary axis of shaft 2, but also prevents rotation of the coupling sleeve 4 by the rotating conical cutter when the conical cutter member is moved out of contact with the workpiece.

After one sharp interior corner of slot 22 has thus been cut, the attachment is removed from the workpiece, and sleeve 40 is rotated slightly to align the apex of the conical cutter member 3 and the cutting edges $3_{CE}$ thereof with the other external corner of spline 30. The attachment is then reintroduced into the slot whereupon the spline guides the movement of the conical cutter member 3 allowing the cutting edges $3_{CE}$ to cut the other sharp interior of the slot. During the latter movement, spline 30 also guides the movement of the conical cutter member parallel to the rotary axis of shaft 2 to cut the respective interior corner, and also prevents rotation of the coupling sleeve 4 when the conical cutter member is moved out of contact with the workpiece.

It will be appreciated that the illustrated attachment could be used without spline 30, but with other guiding and/or rotational-blocking arrangements, such as may be provided in CNC milling machines, for guiding the movement of the attachment with respect to the workpiece and for blocking the rotation of the coupling sleeve when the cutter member is cutting the respective interior corner in the workpiece.

FIG. 7 more particularly illustrates the manner of using the above-described attachment, including the spline 30, for cutting sharp internal corners in a rectangular slot 23 in the inner surface of a hollow shaft. Thus, as described above, when so using the attachment, its conical cutter member 3 would be properly located with its leading end in axial alignment with one corner of spline 30, and then in alignment with the other corner of the spline.

FIG. 7 also illustrates how the attachment may also be used to cut V-slots 24 and rounded slots 25 in the inner face of the hollow shaft. When a rounded slot 25 is to be cut, this may be conveniently done by replacing the conical cutter member 3 with one having a rounded apex.

FIGS. 8 and 9 illustrate an attachment of the same construction as described above with respect to FIG. 14, except that the attachment is further provided with a pair of legs projecting outwardly of the bottom wall of the coupling sleeve 4 for performing the above described functions of spline 30 of FIGS. 5 and 7, and an additional function particularly advantageous when the attachment is to be used in a CNC—operated milling machine. Thus, the illustrated attachment is provided with two legs 31, 32 projecting outwardly of the bottom wall 4f of coupling sleeve 4. Leg 31 is located adjacent to the intersection of sides 4a and 4d of the coupling sleeve, and includes a flat face 31a flush with the inner flat surface of side 4a of the coupling sleeve. Leg 32 is located adjacent to the intersection of sides 4b and 4c of the coupling sleeve, and includes a flat face 32a flush with the inner flat surface of side 4b.

As shown in FIG. 8, the two legs 31, 32 are telescopically receivable within openings formed in bottom wall 4f of coupling sleeve 4 such as to be moveable to various extended positions with respect to the bottom wall. For this purpose, each of the legs 31, 32 includes a spring 33, 34, biasing the respective leg outwardly of the coupling sleeve, and a threaded pin 35, 36, which may be used for fixing the two legs in a desired extended position according to the particular application.

In operation, the milling head rotates the shaft 2 such that the entire case 4 rotates about the axis of the shaft 2. Once the milling head is lowered into the workpiece, at a position where the walls 4a and 4b of the sleeve are co-aligned with the inner walls of the workpiece, the projecting legs 31, 32 come in contact with the side walls thereof, prior to contact of the sleeve walls therewith, thus preventing the milling head from rotating and causing the shaft 2 to transfer the rotation to the cutter member 3.

As indicated above, legs 31, 32, when provided in the attachment, are effective: (a) to guide the movement of the conical cutter member 3 parallel to the longitudinal axis of the rotary shaft 2, (b) to prevent rotation of the coupling sleeve 4 when the walls of the sleeve are still co-aligned with the inner walls of the workpiece but the conical cutter member 3 is moved out of contact with the workpiece, and (c) to facilitate locating the conical cutter member 3 when moved into contact with the workpiece.

The foregoing advantages are particularly important when using the attachment with a CNC—operated milling machine. It will be appreciated that some or all of the foregoing advantages are also obtainable when using only a single leg, or when one leg is shorter than the other.

FIG. 10 illustrates the attachment equipped with an additional guide engageable with a surface of the workpiece for guiding the movement of the conical cutter member 3 with respect to the workpiece. The additional guide illustrated in FIG. 10 is in the form of a pin 40 having a shank 41 threaded in a wall of the coupling sleeve 4, and an enlarged head 42 engageable with the inner surface of the workpiece, to thereby guide the movement of the attachment, particularly the conical cutter member 3, with respect to the workpiece. The workpiece shown is a hollow shaft or sleeve to be formed with one or more slots 23, 24 or 25 on its inner surface as in FIG. 7.

FIG. 11 illustrates another guiding arrangement for guiding the movement of the attachment with respect to the workpiece. The guiding arrangement illustrated in FIG. 11, therein generally designated 50, includes a mounting member 51 fixed to the upper end of coupling sleeve 4, and mounting a laterally-extending arm 52. Two downwardly-extending feeler arms 53, 54, are adjustably mounted by threaded fasteners 55, 56 to lateral arm 52. Feeler arm 53 is adjustable on lateral arm 52 to engage the inner surface of the workpiece, whereas feeler arm 54 is adjustable on lateral arm 52 to engage the outer surface of the workpiece. Both feeler arms preferably include a pair of contact elements, e.g. 54a, 54b to make point contact with the respective surface of the workpiece.

It will thus be seen that the feeler arms 53, 54, when properly adjusted for the respective workpiece, accurately guide the movement of coupling sleeve 4, and thereby of the conical cutter member 3, with respect to the workpiece.

FIG. 12 illustrates a similar guiding assembly except that the guiding assembly itself is adjustable along the length (height) of coupling sleeve 4 of the attachment. Thus, the guiding assembly illustrated in FIG. 12, and therein designated 50', includes a mounting member 57 adjustably mounted along the length (height) of coupling sleeve 4 of the attachment by the threaded fastener 58. The remainder of guiding assembly 50' illustrated in FIG. 12 is substantially the same as in FIG. 11, and therefore the corresponding elements have been identified with the same reference numerals.

Figure 13:
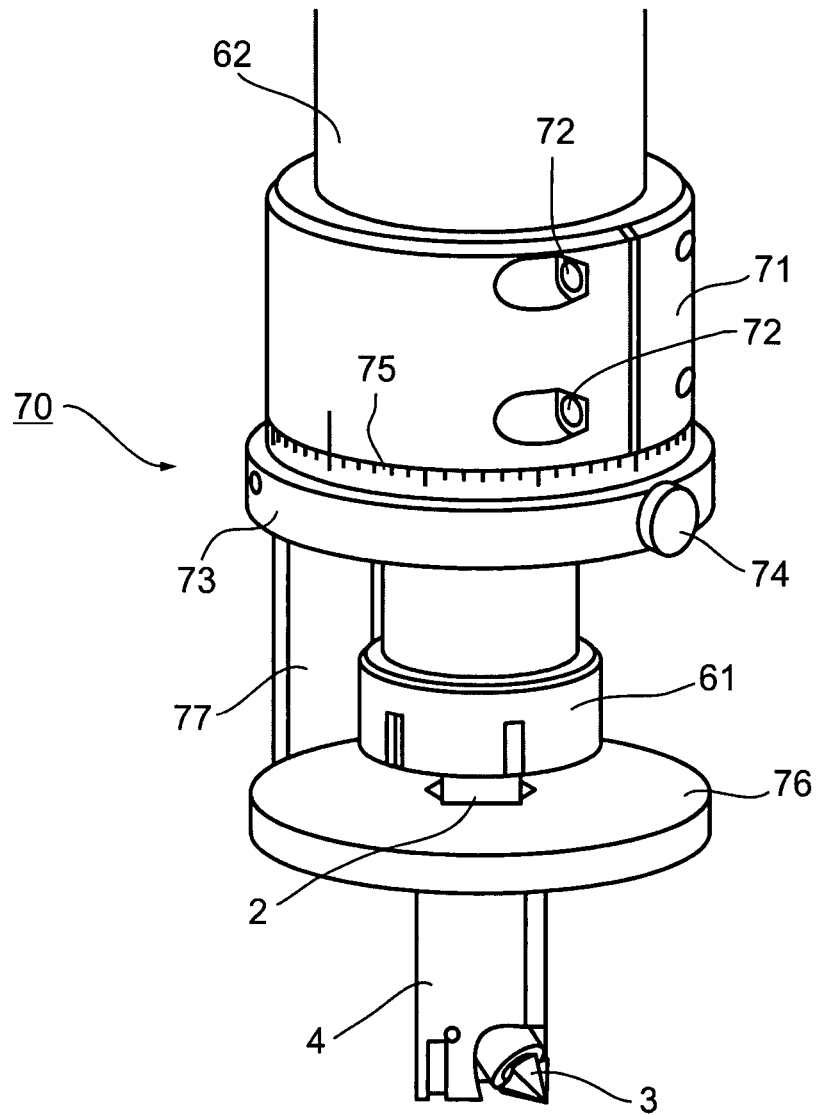
FIG. 13 illustrates another attachment constructed in accordance with the present invention and including a mounting assembly for mounting the attachment to the milling machine head in a manner permitting angular adjustment of the attachment with respect to the milling machine head.

FIG. 13 illustrates the attachment mounted to the rotary—drive end of a milling machine head by an adjustable mounting assembly which permits angular adjustment of the rotary cutter member 3 with respect to the coupling sleeve 4. In FIG. 13, the rotary—drive end of the milling machine is indicated by its chuck 61, to which the attachment is normally clamped, projecting from a section of the milling machine head 62 or from any fixed part of the milling machine.

The mounting assembly illustrated in FIG. 13 is generally designated 70. It includes a sleeve 71 fixed to head section 62 by fasteners or clamping elements 72; and a ring 73 angularly adjustable with respect to sleeve 71 and presettable by a knob 74. The sleeve and/or the ring include graduation markings 75 to indicate the angular position of the ring with respect to the sleeve.

Mounting assembly 70 further includes a disc 76 coupled to ring 73 by a coupling plate 77 such that the angular position of disc 76 is indicated by the graduation markings 75.

Coupling sleeve 4 of the attachment is fixed to disc 76. Rotary shaft 2 of the attachment extends through an opening in the disc and is clamped to the milling machine chuck 61. It will thus be seen that the angular position of coupling sleeve 4, as well as the of the conical cutter member 3 rotatably mounted within the coupling sleeve, are both indicated by the graduation markings 75.

Disc 76 may be preset by ring 73 to any desired position to thereby preset the angular position of coupling sleeve 4 and conical cutter member 3 according to the particular milling operation to be performed. Such positioning of the coupling sleeve and conical cutter member may be done manually, or by machine, e.g. via a CNC machine control, according to the milling operation to be performed.

Figure 14:
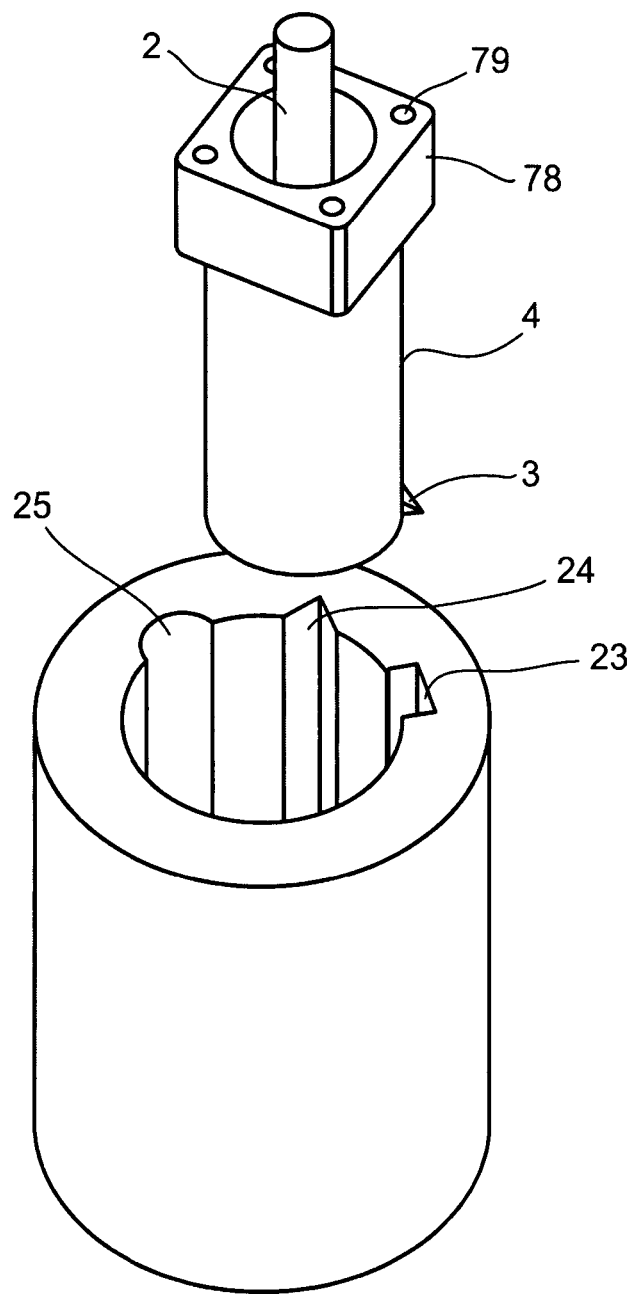
FIG. 14 illustrates another attachment constructed in accordance with the present invention to include a cylindrical coupling sleeve particularly useful for cutting internal slots in hollow shafts.

FIG. 14 illustrates one manner of mounting coupling sleeve 4 of the attachment to angularly-adjustable disc 76, to permit angular adjustment of the coupling sleeve and the conical cutter member 3 rotatably mounted within it. Thus, as shown in FIG. 14, the upper end of coupling sleeve 4 is integrally formed with a flange 78 securable by fasteners 79 to disc 76, with the rotary shaft 2 projecting through the flange for clamping engagement with chuck 61 of the milling machine.

It will be appreciated that the mounting arrangement illustrated in FIG. 14, including the mounting flange 78, may be used for mounting the attachment directly to the rotary-drive end of the milling machine head where angular adjustment of the attachment is not needed.

FIG. 14 also illustrates the variation wherein the coupling sleeve 4 of the attachment is not of hexahedral configuration, as in the previously described embodiments, but rather is of cylindrical configuration. Such a configuration may be desirable where the workpiece is a hollow shaft, such as in FIGS. 7 or 10, and one or more slots are to be machined in the inner surface of the hollow shaft. For purposes of example, FIG. 14 illustrates the formation of a rectangular slot 23 with two sharp internal corners, a V-shaped slot 24 with a single sharp internal corner, and a rounded slot 25. As indicated above, a rounded slot 25 may be formed in the inner surface of the hollow shaft by using a conical cutter member 3 having a rounded apex, rather than a sharply-pointed apex, wherein the shape of the cutting edge(s) $3_{CE}$ changes respectively.

Figure 15A:
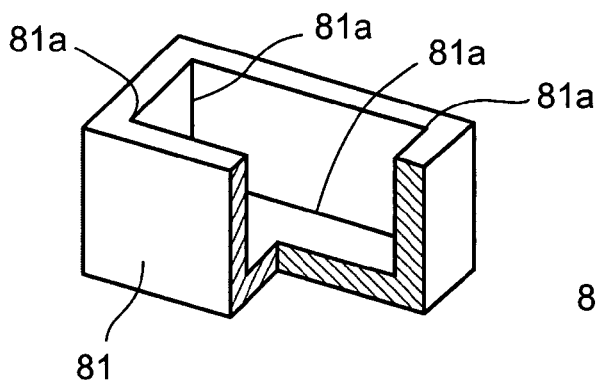
FIGS. 15a-15e illustrate various other types of cutting operations capable of being performed by an attachment constructed in accordance with the present invention.
Figure 15B:
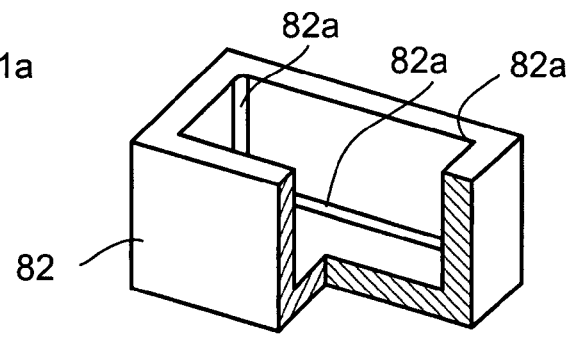
Figure 15C:
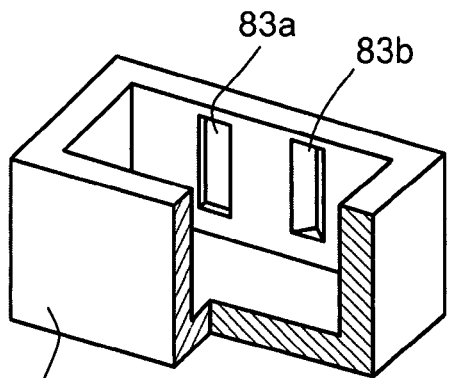
Figure 15D:
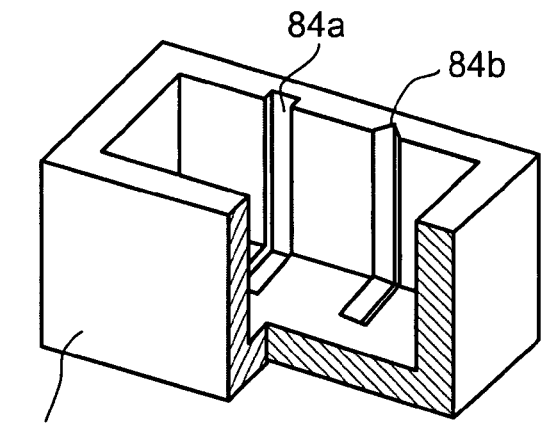
Figure 15E:
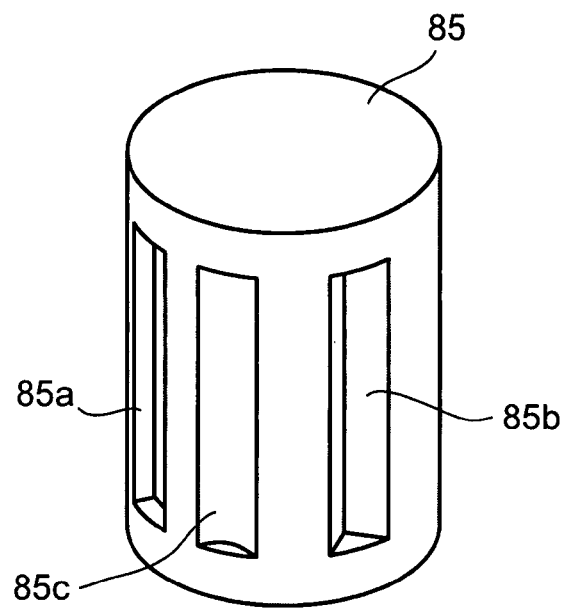

FIGS. 15a-15e illustrate still further examples of cutting operations capable of being performed by using an attachment constructed as described above. Thus, FIG. 15a illustrates the workpiece 81 formed with sharp interior corners 81a; FIG. 15b illustrates the workpiece 82 formed with interior corners 82a having flat or curved transitions; FIG. 15c illustrates a workpiece 83 formed with closed slots 83a of rectangular configuration and closed slots 83b of V-configuration having sharp interior corners; FIG. 15d illustrates a workpiece 85 formed with sharply-cornered open slots of rectangular configuration 84a and V-configuration 84b; and FIG. 15e illustrates a solid cylindrical workpiece 84 formed on its outer surface with sharply-cornered slots 85a of rectangular configuration, sharply-cornered slots 85b of V-configuration, and rounded surface slots 85c.

Figure 16:
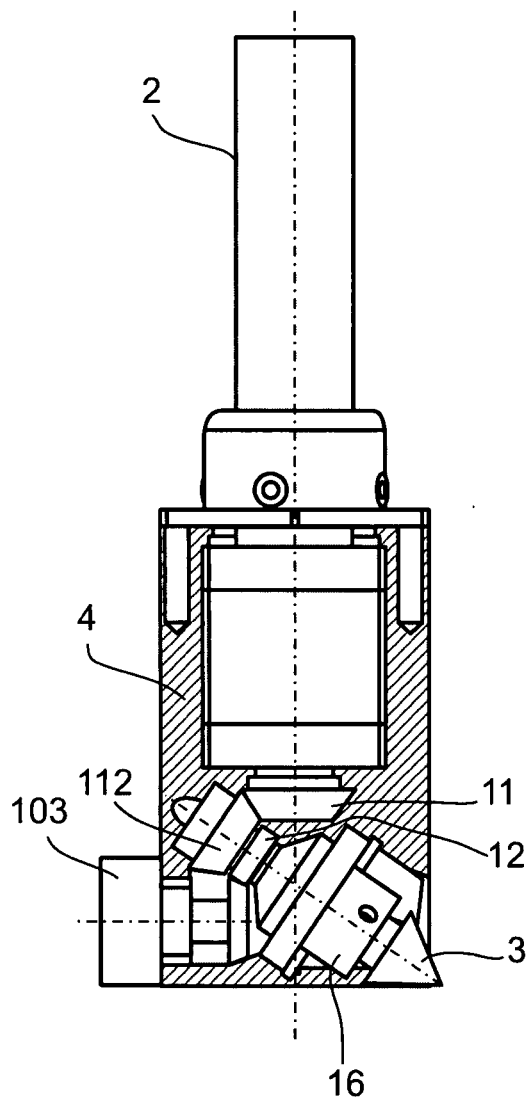
FIG. 16 is a sectional view illustrating another attachment constructed in accordance with the present invention to include two rotary cutter members.

FIG. 16 illustrates an attachment similar to that illustrated in FIG. 2b, but modified for mounting a second cutter member in addition to the conical cutter member 3. To facilitate understanding, those elements in FIG. 16 which correspond to the elements in FIG. 2a are identified by the same reference numerals. Thus, as shown in FIG. 16, bevel gear 11, which engages bevel gear 12 to rotate the conical cutter member 3, also engages a second bevel gear 112 to rotate a second rotary cutter member 103. Whereas rotary cutter member 3 is of conical configuration as described above, the second rotary cutter member 103 is of cylindrical configuration. In addition, whereas the rotary axis RA of the rotary cutter member 3 is substantially 540 to the longitudinal axis of the shaft 2, the rotary axis RA of cylindrical cutter member 103 is substantially 90° to the longitudinal axis of shaft 2.

An attachment constructed as illustrated in FIG. 16 provides all the advantages described above with respect to the attachment of FIGS. 1, 2a and 2b, with the additional advantage of permitting the same attachment also to be used for other cutting operations via its cylindrical cutter member 103.

Figure 17:
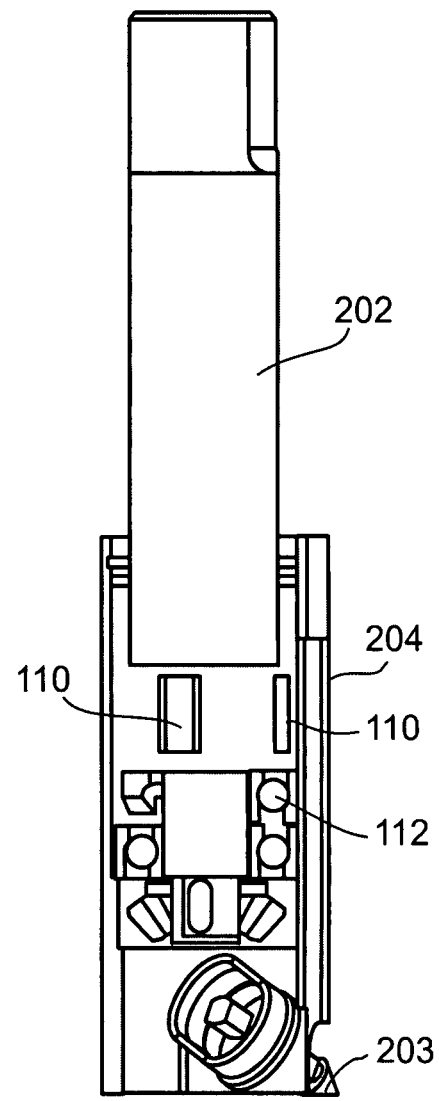
FIG. 17 illustrates a milling machine head attachment in accordance with the present invention provided with a releasable coupling to permit initial orientation of the rotary cutter member with respect to a workpiece.
Figure 18:
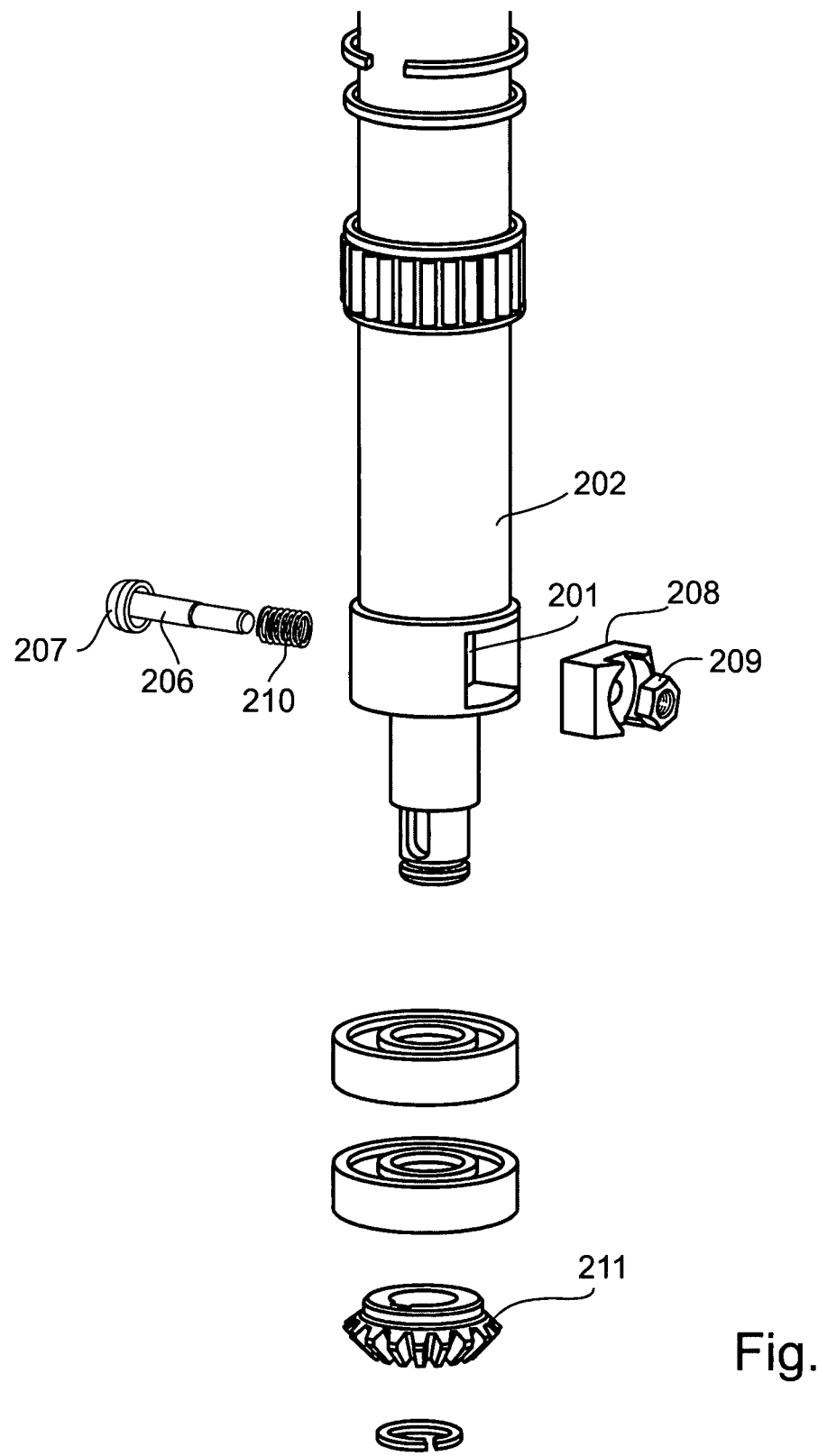
FIG. 18 is an exploded view illustrating particularly the main elements of the releasable coupling in the attachment of FIG. 17.
Figure 19:
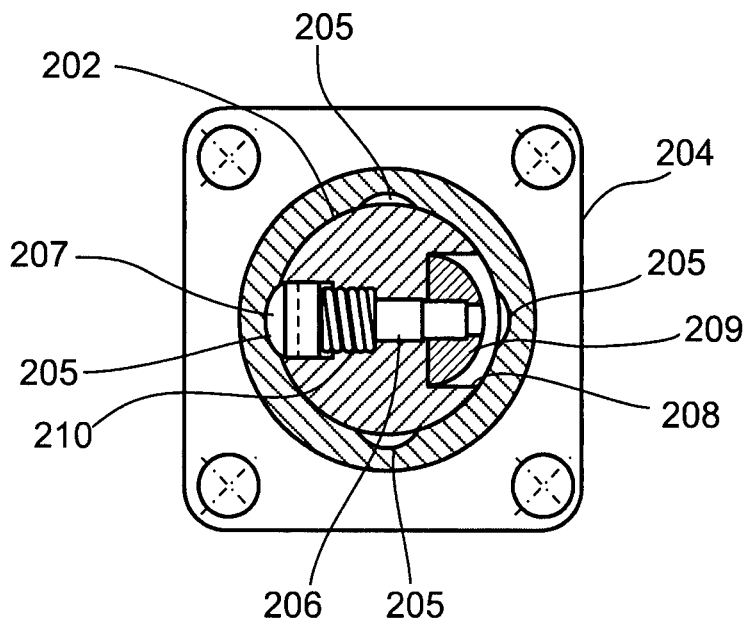
FIG. 19 is a sectional view illustrating the releasable coupling in the attachment of FIGS. 17 and 18.

FIGS. 17-19 illustrate an attachment including a coupling sleeve, therein designated 204, provided with a releasable coupling normally coupling the rotary cutting member 203 to a rotary shaft 202, via a bevel gear 211, but effective to release the coupling sleeve 204 from the rotary shaft 202 at a predetermined rotary speed of the rotary shaft. Such a releasable coupling permits the coupling sleeve to be rotated angularly with respect to the rotary shaft to permit initial orientation of the rotary cutter member 203 with respect to the workpieces, and after the rotary cutter member has been properly oriented, the coupling of the coupling sleeve with respect to the rotary shaft is released automatically, so as to permit free rotation of the rotary cutter member with respect to the coupling sleeve during a normal cutting operation.

Thus, rotary shaft 202 is formed with a through-going transverse bore 201 (FIG. 18), and the inner surface of coupling sleeve 204 is formed with at least one recess 205 (FIG. 19), preferably four recesses 205 equally spaced around the circumference of the sleeve. A pin 206 (FIG. 18) is received within transverse bore 201 and is dimensioned so as to be freely moveable with the bore. One end of pin 206 is formed with a rounded enlarged head 207 seatable within one of the recesses 205 formed on the inner surface of sleeve 204. The opposite end of pin 206 carries a weight 208 secured thereto by a nut 209. A spring 210 on pin 206 urges the enlarged rounded head 207 of the pin outwardly, to seat into one of the recesses 205 (FIG. 19). However, when shaft 202 is rotated during a normal cutting operation, weight 208 is forced outwardly by centrifugal force to unseat enlarged head 207 of pin 206 from the recess 205, to thereby permit free rotation of shaft 202 with respect to sleeve 204.

Each recess 205 on the inner surface of the coupling sleeve 204 may serve as a reference position for releasably retaining the coupling sleeve, and thereby its rotary cutter member, in any selected angular position with respect to the workpiece. Rotation of coupling sleeve 204, to properly locate its rotary cutter member, may be done manually or automatically by the initial rotation of shaft 202. When the rotary cutter member is properly located with respect to the workpiece, the rotation of shaft 202 at its normal operating speed will cause weight 208 to move pin 206 in the direction to unseat its enlarged rounded head 207 from recess 205, and thereby to permit free rotation of the shaft 202 with respect to coupling sleeve 204, without any interference or "clicking" sounds by the seating and unseating of pin 206 in the recesses 205.

In all other respects, the attachment illustrated in FIGS. 17-19 may be constructed and operated as described above with respect to any of the attachments of FIGS. 1-16.

Figure 20:
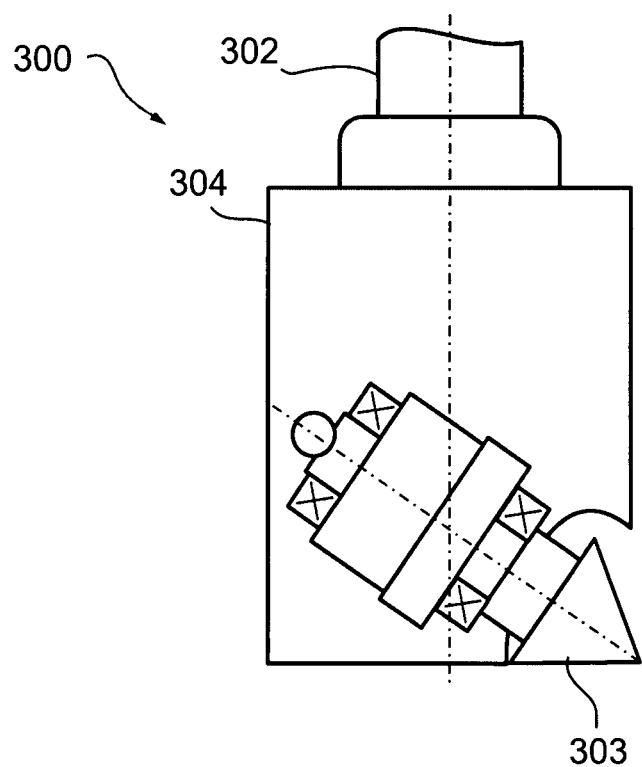
FIG. 20 illustrates another attachment constructed in accordance with the present invention to include its own drive.

FIG. 20 illustrates a further variation in the structure of the attachment, generally designated 300. In this variation, shaft 302 serves merely as a mounting shaft for mounting the coupling sleeve 304, and does not rotate the rotary cutter member 303. Rather, coupling sleeve 304 includes its own drive 310, such as a small electrical motor or hydraulic motor, which drives the rotary cutter member 303. In all other respects, attachment 300 illustrated in FIG. 20 may be constructed, and operated, in the manner described above with respect to any of those attachments.

While the invention has been described with respect to several preferred embodiments, it will be appreciated that many other variations and modifications may be made. For example, the attachment could include a coupling sleeve which mounts not only two conical cutter members (e.g., FIG. 16), but three or four (i.e., one of each of the four corners) when a hexahedral coupling sleeve is used. Also, the coupling sleeve could be of other configurations, for example cylindrical, oval, triangular, etc. In addition, other coupling means can be provided, such as friction-type coupling devices, for coupling the conical cutter member to the rotary shaft. The attachment could also be embodied as a kit including cutter members of different types (e.g. sharply-pointed, rounded, etc.) as well as of different dimensions, to enable the user to select the appropriate cutter member for the particular milling operation to be performed.

Further, the releasable coupling arrangement described above with respect to FIGS. 17-19 could be used in other apparatus including a rotary shaft driving another type of rotary device so as to release the rotary device from the rotary shaft at a predetermined rotary speed of the rotary shaft.

Those skilled in the art to which this invention pertains will readily appreciate that numerous changes, variations, and modifications can be made without departing from the scope of the invention, mutatis mutandis.

The invention claimed is:

1. An attachment to a milling machine head having a rotary drive, for cutting sharp interior corners in a workpiece, said attachment comprising:
    a rotary shaft couplable to the rotary drive of the milling machine head so as to be rotatable about a longitudinal axis of the rotary shaft;
    a conical cutter member comprising:
        a rotary axis, an apex located on said rotary axis,
        at least one external conical surface portion having a leading end at said apex and a trailing end spaced apart from said rotary axis and from said apex along said rotary axis; and
        a cutting edge constituting a part of said conical surface portion and extending between said leading and trailing ends thereof; said rotary axis of the conical cutter member being oriented transversely though not perpendicularly to said shaft longitudinal axis; and the conical cutter member being coupled to the rotary shaft so as to be rotated about said rotary axis by the shaft, upon the shaft's rotation about said longitudinal axis;
    wherein the attachment further comprises:
        a coupling sleeve with top and bottom walls, and side walls extending therebetween, and an opening at an intersection between the bottom wall and two adjacent side walls, with which opening the conical cutter member is aligned, and
        wherein said apex of said conical cutter member is locatable to be flush with the outer surfaces of said two adjacent side walls and bottom wall of the coupling sleeve at said intersection, such that said coupling sleeve enables the conical cutter member to cut a sharp interior corner in a workpiece.

2. An attachment according to claim 1, wherein said sleeve is attachable to the milling machine head with a longitudinal axis of the coupling sleeve coaxial to the longitudinal axis of the shaft.

3. The attachment according to claim 2 wherein said conical cutter member is adjustably mounted with respect to said coupling sleeve to permit the apex of the conical cutter member to be projected a desired distance through said opening in the coupling sleeve.

4. The attachment according to claim 2, wherein said coupling sleeve includes at least one leg projecting outwardly of said bottom wall, said at least one leg having a flat outer surface such that said at least one leg is effective (a) to guide movement of said conical cutter member parallel to said longitudinal axis of the rotary shaft, (b) to prevent rotation of the coupling sleeve when the side walls of the sleeve are co-aligned with inner walls of the workpiece but the conical cutter member is moved out of contact with the workpiece, and (c) to facilitate locating said conical cutter member.

5. The attachment according to claim 4, wherein said at least one leg includes a second leg projecting outwardly of said bottom wall.

6. The attachment according to claim 2, wherein said coupling sleeve includes an adjustable guide projecting laterally, with respect to the longitudinal axis of the shaft, from the coupling sleeve and engageable with a surface of the workpiece for guiding a movement of the conical cutter member with respect to the workpiece.

7. The attachment according to claim 6, wherein said adjustable guide is carried by an external surface of said coupling sleeve and is engageable with an external surface of the workpiece to guide the movement of the conical cutter member with respect to the workpiece.

8. The attachment according to claim 1, wherein said attachment, when attached to the milling machine head, is rotatable with respect thereto so as to permit angular adjustment of the attachment, and thereby of the rotary axis of the conical cutter member, around said longitudinal axis of said rotary shaft.

9. The attachment according to claim 1, wherein said rotary shaft carries a first bevel gear and said cutter member carries a second bevel gear engageable with said first bevel gear carried by the shaft.

10. The attachment according to claim 9, wherein said shaft is rotated by the milling machine head such that said shaft rotates said conical cutter member by the engagement of the second bevel gear with the first bevel gear.

11. The attachment according to claim 1, wherein said conical cutter member is adjustably mounted with respect to said coupling sleeve so as to permit the apex of the conical cutter member to be projected a desired distance through said opening in the wall of the coupling sleeve.

12. The attachment according to claim 1, wherein said conical cutter member defines a cone angle of substantially 70°.

13. The attachment according to claim 1, wherein the angle of the rotary axis of said conical member, with respect to said longitudinal axis of the rotary shaft, forms an acute angle of substantially 55°.

14. The attachment according to claim 1, wherein said conical cutter member has a rounded apex.

15. The attachment according to claim 1, wherein said attachment includes a spline receivable within a groove formed in a workpiece, (a) to guide a movement of said conical cutter member parallel to said longitudinal axis of the rotary shaft, and (b) to prevent rotation of the attachment when the conical cutter member is moved out of contact with said workpiece.

16. The attachment according to claim 15, wherein said conical cutter member is adjustable to a position such that said spline is aligned with said apex of the conical cutter member.

17. The attachment according to claim 1, wherein said attachment is attachable to a fixed member of the milling machine head by a mounting assembly which permits angular adjustment of the attachment with respect to said fixed member of the milling machine head.

18. The attachment according to claim 17, wherein said mounting assembly comprises:
- a mounting ring mountable to said fixed member and adjustable with respect thereto;
- a rotatable disc carrying said attachment; and
- a mechanical coupling between said disc and said mounting ring to permit angular adjustment of said rotatable disc and attachment with respect to said fixed member of the milling machine head.

19. The attachment according to claim 1, wherein said transverse but not perpendicular arrangement of the rotary axis of the conical cutter member relative to the longitudinal axis of the shaft defines a first predetermined angle, the attachment further comprising a second rotary cutter member rotatable about a rotary axis which is at a second predetermined angle to said longitudinal axis of the rotary shaft.

20. The attachment according to claim 19, wherein said first predetermined angle is substantially 70°, and said second predetermined angle is substantially 90°.

21. The attachment according to claim 1, wherein said attachment further includes a releasable coupling normally coupling the cutter member to said rotary shaft to permit angular adjustment of the cutter member with respect to said rotary shaft; said coupling being releasable upon the blocking of rotation of the attachment, to thereby permit the cutter member to freely rotate about its rotary axis during a cutting operation.

22. The attachment according to claim 21, wherein a projection is carried by the rotary shaft, the projection being spring-urged into a recess carried by the attachment.

23. The attachment according to claim 22, wherein said projection carried by the rotary shaft includes a weight effective to withdraw the projection from said recess by centrifugal force upon the rotation of the shaft above a predetermined speed.

* * * * *